United States Patent [19]

Utano et al.

[11] Patent Number: 5,805,623

[45] Date of Patent: Sep. 8, 1998

[54] SOLID-STATE DYE LASER UTILIZING MULTIPLE DYES IN SINGLE HOST

[75] Inventors: Richard Utano; Suresh Chandra, both of Springfield; Toomas H. Allik, Alexandria, all of Va.; Timothy R. Robinson, Seattle, Wash.

[73] Assignee: The United States of America as represented by the Secretary of the Army, Washington, D.C.

[21] Appl. No.: 861,488

[22] Filed: May 22, 1997

Related U.S. Application Data

[63] Continuation-in-part of Ser. No. 589,908, Jan. 23, 1996, abandoned.

[51] Int. Cl.⁶ .................................................. H01S 3/10
[52] U.S. Cl. ................................................ 372/23; 372/54
[58] Field of Search ............................. 372/54, 53, 92, 372/43, 39, 623

[56] References Cited

U.S. PATENT DOCUMENTS

| | | | |
|---|---|---|---|
| 4,603,940 | 8/1986 | Shaw et al. ................................. | 372/6 |
| 4,807,237 | 2/1989 | Ernsting ..................................... | 372/53 |
| 4,878,224 | 10/1989 | Kuder et al. ............................... | 372/53 |
| 5,222,092 | 6/1993 | Hench et al. .............................. | 372/53 |
| 5,448,582 | 9/1995 | Lawandy .................................... | 372/42 |
| 5,530,711 | 6/1996 | Scheps ....................................... | 372/54 |

OTHER PUBLICATIONS

Bethea; "Megawatt Power at 1.318 in Nd+3: YAG and Simultaneous Oscillation at Both 1.06 and 1.318 ";IEEE Journal of Quantum Electronics; Feb.1973.

*Primary Examiner*—Leon Scott, Jr.
*Attorney, Agent, or Firm*—Milton W. Lee; John E. Holford; Alain L. Bashore

[57] ABSTRACT

A solid-state dye laser and technique for achieving multiple output wavelength laser emission from a single solid-state dye laser media containing multiple dyes without tuning elements. When the multiple dyes within the single solid-state host are excited with a single wavelength pump source to lase, there results simultaneous multi-spectral output proportional to dye concentration ratios.

2 Claims, 2 Drawing Sheets

SOLID-STATE DYE LASER UTILIZING MULTIPLE DYES IN SINGLE HOST

This is a filing for a continuation-in-part of Ser. No. 08/589,908, filed on 23 Jan. 1996 now abandoned.

DESCRIPTION

The invention described herein may be manufactured, used, and licensed by the U.S. Government for governmental purposes without the payment of any royalties thereon.

BACKGROUND OF THE INVENTION

1. Field of the Invention

The present invention generally relates to solid-state dye lasers and more specifically, to a solid state dye laser having multiple and succinctly different dye molecules within a single solid-state host that achieve simultaneous multi-spectral output without the use of tuning elements.

2. Description of Prior Art

Dye-doped solid-state materials are attractive as sources of tunable laser radiation. They carry advantages over non-linear techniques (e.g. Raman scattering and optical parametric oscillation) such as nearly threshold-less operation, linear sensitivity to fluctuations in the pump laser intensity, and that the excitation source need not be coherent. Even so, solid-state dye lasers have remained impractical because of such problems as poor photo-stability, low quantum yields, and detrimental thermal effects.

The advent of pyrromethene-$BF_2$ complex (PM) dyes together with development of new plastics is now making solid-state dye lasers practical. Dye laser conversion efficiencies exceeding 80% have been demonstrated in both solid and liquid hosts pumped by frequency doubled Nd:YAG lasers. Also, dye doped plastic longevities of 1,000,000 pulses for a fixed area with output energies ranging from 100–150 mJ have been demonstrated. While dyes have also been tuned over an approximate 50 nm wavelength range in solids, tuning elements must be added into the cavity to achieve this output range. Without tuning elements, the dye bandwidth of the laser is approximately 10 nm full width at half maximum (FWHM) around the peak wavelength.

To achieve emission beyond its gain bandwidth, a completely new laser dye molecule must be introduced into the laser system. In the prior art, this required removing the old dye media, and incorporating the new media. This movement required either a motorized unit to change the dye material or an electro-optical unit to change the optical path of the laser. These additions created additional complexities optically (re-alignments could be necessary) or added to the weight and size of the laser system.

To achieve simultaneous output of multiple wavelengths, either two dye materials would be pumped at their characteristic absorption bandwidth or disperse optical elements would be incorporated into the optical resonator. If the dye emission wavelength required were considerably separated (>100 nm), different dyes could very well require two different pump sources for efficient pumping.

While the prior art has reported the use of solid-state laser dyes, none have established a basis for a specific apparatus that is dedicated to the task of resolving the particular problem at hand. What is needed in this instance is a new solid state dye laser and technique that achieves simultaneous multi-spectral output without the use of tuning elements.

SUMMARY OF THE INVENTION

It is therefore one object of the invention to provide a new solid-state dye laser and technique that achieves simultaneous multi-spectral output without the need of tuning elements and requiring only one pump wavelength.

According to the invention, there is disclosed a technique and laser for achieving multiple output wavelength laser emission from a single solid-state dye laser media containing multiple dyes without tuning elements. The dye medium is doped with multiple dyes having predetermined dye concentration ratios into an optical solid-state host. The optical solid state host is then incorporated into a cavity means of a laser oscillator. Pump energy is then applied to the optical solid-state host to excite at least one of the dyes to effect laser output from the laser oscillator. Additional dye to dye interactions within the solid-state host are excited to produce multiple laser emission of simultaneous multi-spectral output proportional to the predetermined dye concentration ratios.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

By determining the necessary output desired, a single solid-state dye laser media is doped with multiple dye molecules at desired concentration ratios to allow laser output at multiple frequencies. A suitable excitation source is chosen with known source wavelength which is absorbed by a minimum of one predetermined dye molecule. The excitation source is positioned external to the dye laser cavity. In the preferred embodiment, to determine necessary concentration ratio required, to liquid dye solutions in a common solvent is prepared first. The liquid is used to achieve flexibility in changing the concentration ratios. It is understood that the invention is not limited to a specific method of determining dye concentration ratios. Other methods for establishing such, may include using entirely solid mediums. A spectrophotometer cuvette is used, in the preferred embodiment, to administer the appropriate dilution. The spectral properties of the dyes in the common liquid solvent must approximately mimic those in the solid state dye host. The absorption band of the longer wavelength emitting dye (LWED), absorbs the emission of the shorter wavelength emitting dye (SWED). Therefore a very weak concentration of LWED is slowly added to the SWED solution (that contained a predetermined SWED concentration level for efficient lasing) until the long wavelength dye lases. Additional LWED is then added to achieve equal intensities at both wavelengths. This concentration ratio is therefore now determined, and then incorporated into the solid-state host and made to lase at the two wavelengths.

Any prior art dye laser pumping architectures may be used to excite the solid-state dye host containing multiple dyes. The only requirement is for the excitation source ($\lambda_e$)

to be chosen to pump the SWED which then emits at wavelengths which other dyes absorb. Energy is transferred by radiative or non-radiative means from the SWED to the other absorbing dyes (LWED). Sufficient LWED needs to be excited to reach threshold in the cavity. Additional LWED can be added to give any ratio of output desired. This cascade process produces multiple laser wavelengths ($\lambda_n$) may be separated by an interval much greater than is obtainable for a single dye rod without the use of any tuning elements when multiple types of dye molecules are present.

As an extreme limit, increasing the LWED concentration so it is the only dye lasing may also be performed. Enhanced performance/efficiency compared to only using the LWED in the is observed. This approach is achieved at the limit where only the LWED lases. Effectively, the SWED acts as an efficient wavelength converter that emits in the absorption band of the LWED. This increases the energy transfer from the pump wavelength to the LWED for a given LWED concentration.

Figure 1:
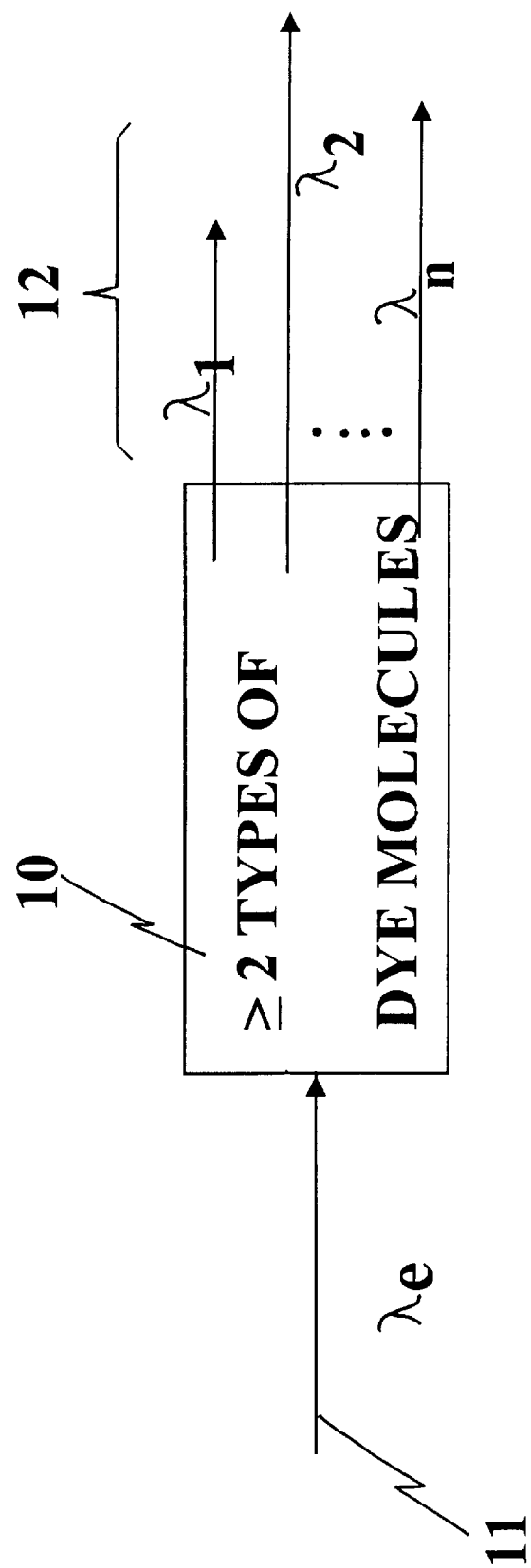
FIG. 1 is a schematic of the multiple dye doped host being pumped by a characteristic excitation wavelength ($\lambda e$) and emitting multiple wavelengths.

FIG. 1 is a schematic of dye doped host 10 being pumped by excitation source 11, shown as a characteristic excitation wavelength ($\lambda_e$). There is emitted from the laser cavity multiple wavelengths 12, which have a characteristic output of each of the dye molecules in the host ($\lambda_1, \lambda_2, \ldots \lambda_n$). It is understood that sufficient gain in each of the dyes must by present to reach lasing threshold. Additional benefits can be obtained by mating conditions for better cavity mode operations. Pump fluence levels must be kept low to prevent damaging the plastic/solid- state host material. Therefore high energy dye outputs require large pump areas. The combination of the high gain and large mode volume, makes it difficult to design an oscillator with good beam quality. By promoting separate dyes to lase, the effective gain at each wavelength is reduced but pump absorption and energy output stays high. This helps reducing parasitic and amplified spontaneous emission (ASE) effects that rob energy from the cavity and makes it difficult to achieve good beam quality.

The technique is applicable to any optical solid state host, including plastics, glasses, or sol-gels where a dye can be introduced. The excitation of the dye can be achieved by any laser source, including semi-conductor diode lasers ( of the appropriate wavelength) and flashlamp source. Since the dyes act independently in the host, the threshold condition for each of the dyes must be met where other dyes may act as loss mechanism. This mechanism can be used to achieve multiple wavelengths ($\geq 2$) from one device or to enhance the output of a LWED.

In the preferred working embodiment, pyrromethene-$BF_2$ complex (PM) dyes were utilized in the solid-state dye of the preferred embodiment. Two samples of multiple dye doped high temperature plastic EXCILITE were prepared. One containing $2.7 \times 10^{-4}$M of PM580 (1,3,5,7,8 - pentamethyl-2-6-di-n-butyl pyrromethene $BF_2$ complex) and $2.7 \times 10^{-5}$M of PM650 (1,2,3,5,6,7 -hexamethyl-8-cyano pyrromethene $BF_2$ complex) and the other sample contained $2 \times 10^{-4}$M of PM597 (1,3,5,7,8 - pentamethyl-2-6-di-tert-butyl pyrromethene $BF_2$ complex) and $1 \times 10^{-5}$M of PM650. These concentration were based on measurements made in a solvent blend containing xylene.

PM580, PM597 and PM650 are all available from Exciton Corp, Dayton, Ohio EXCILITE is a product from Korry Electronics Company, Seattle, Wash., composed of an optically clear thermosetting plastic material used to host laser dye materials. The plastic properties are described in: "Laser performance and material properties of a high temperature plastic doped with pyrromethene-$BF_2$ dyes"; T. H. Allik et al.; Mat. Res. Soc. Symp. Proc. 329, 291 (1994);

A frequency double Nd:YAG (532 nm) laser acted as the excitation source in the present embodiment of the invention. To achieve the necessary flexibility in changing the concentrations ratio, liquid dye solutions (xylene) and a one centimeter path length spectrophotometer cuvette was used. The spectral properties of the PM dyes in xylene mimics those in EXCILITE. The absorption band of the LWED, in this case PM650, absorbs the emission of the shorter wavelength dyes (PM580 or PM597). Therefore a very weak concentration of LWED was slowly added to the SWED solution (that contained a SWED concentration level for efficient lasing) until the long wavelength dye lased. Additional PM650 was added to achieve equal intensities at both wavelengths. This concentration ratio was then incorporated into EXCILITE and made to lase at the two wavelengths. As an extreme limit, increasing the LWED so it was the only dye lasing was also demonstrated. Enhanced performance compared to only using the LWED in the solution was observed. This concentration ratio was also added to EXCILITE and successfully lased.

Figure 2:
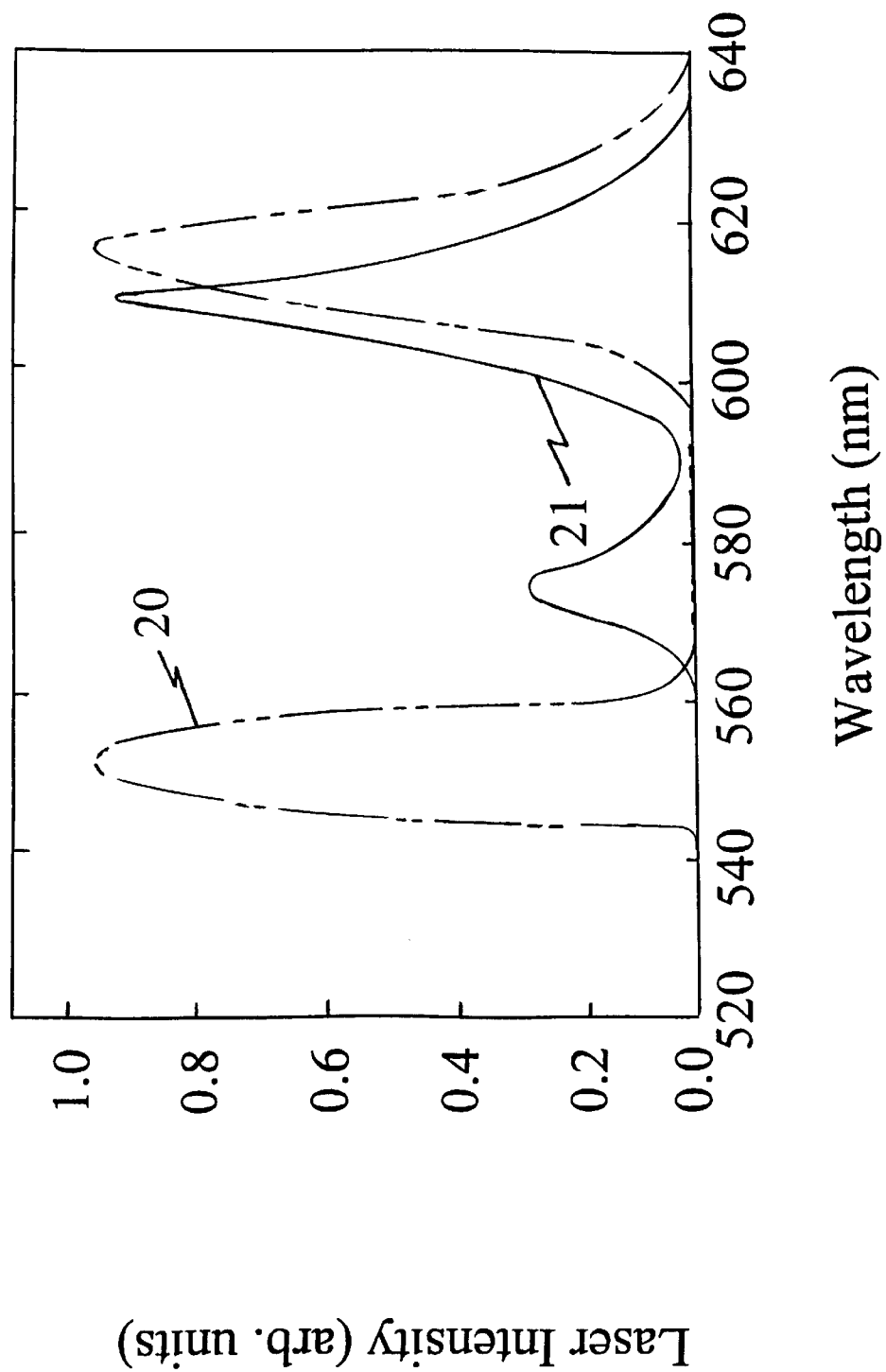
FIG. 2 is the multiple wavelength ($\lambda_1, \lambda_2, \ldots \lambda_n$) output spectra resultant from use of the solid-state dye laser invention.

FIG. 2 shows the output spectra resultant from use of the solid-state dye laser of the invention. Curve 20 is the spectra curve for PM580/PM650 while curve 21 is the spectra curve PM597/PM650. Both spectra were taken while laser action was in progress. The cavity was a conventional end-pumped, flat/flat resonator. A 50% reflective output coupler was used with a broadband highly reflective between 560–650 nm and an 98% transmission at the 532 nm pump as the back mirror. An optical multichannel analyzer system with a 1024 element silicon array was used to monitor the wavelength of the laser output.

This invention thus allows:

one host media to be doped with the proper dyes that effectively increase the emission bandwidth by many times one dye gain bandwidths, and one pump source to efficiently pump dye laser molecules that would otherwise not be efficiently pumped with a given laser.

While this invention has been described in terms of preferred embodiment consisting of the preferred embodiment, those skilled in the art will recognize that the invention can be practiced with modification within the spirit and scope of the appended claims.

Having thus described our invention, what We claim as new and desire to secure by Letters Patent is as follows:

1. A technique for achieving multiple output wavelength laser emission from a single solid-state dye laser media, said single solid-state laser media containing multiple dyes having predetermined dye concentration ratios, said technique comprising:

doping a dye medium with multiple dyes having predetermined dye concentration ratios into an optical solid-state host;

incorporating said optical solid-state host within a cavity means of a laser oscillator;

applying pump energy to said optical solid-state host to excite a minimum of at least one of the dyes to effect laser output from said laser oscillator whereby additional dye to dye interactions within the solid-state host are excited to produce multiple laser emissions of simultaneous multi-spectral outputs proportional to said predetermined dye concentration ratios.

2. A solid-state dye laser for achieving multiple output wavelength laser emission from a single solid-state dye laser media, said single solid-state laser media containing multiple dyes having predetermined dye concentration ratios, said laser comprising:

a cavity means which defines a laser oscillator;

an optical solid-state host within said cavity means, said optical solid-state host containing multiple dyes with predetermined dye concentration ratios;

means for applying pump energy to said optical solid-state host to effect laser output created from dye to dye interactions from said laser oscillator whereby the multiple dye molecules within the solid-state host are excited to lase simultaneous multi-spectra outputs proportional to said predetermined dye concentration ratios.

* * * * *